3,387,950
PREPARATION OF PHOSPHORUS THIOFLUORIDE FROM PHOSPHORUS PENTASULFIDE AND HYDROGEN FLUORIDE
Herbert W. Roesky, Gottingen, Germany, assignor to E. I. du Pont de Nemours and Company, Wilmington, Del., a corporation of Delaware
No Drawing. Filed June 17, 1966, Ser. No. 558,279
3 Claims. (Cl. 23—368)

ABSTRACT OF THE DISCLOSURE

Described and claimed are the preparation of the known compound phosphorus thiofluoride, $PSF_3$, by the reaction of phosphorus pentasulfide with hydrogen fluoride at 100–250° C., especially in $HF/P_2S_5$ mole ratios of 6:1 to 10:1.

FIELD OF THE INVENTION

This invention is concerned with a new process for preparing phosphorus thiofluoride, $PF_3S$.

DESCRIPTION OF THE INVENTION

Phosphorus thiofluoride, an old compound, has been prepared in several ways. One method has been to heat a mixture of phosphorus pentasulfide ($P_4S_{10}$) and lead fluoride ($PbF_2$) in an atmosphere of nitrogen as shown by Thorpe and Roger, J. Chem. Soc. 53, 766 (1888) and 55, 306 (1889).

There has now been discovered an improved process for preparing phosphorus thiofluoride which involves the reaction of phosphorus pentasulfide with hydrogen fluoride at temperatures in the range from 100 to 250° C.

The process of this invention has the advantage of employing a less expensive combination of starting materials than previously known processes, and the optimum yields of phosphorus thiofluoride are higher.

The process may be carried out in any vessel which is reasonably inert to the reactants and products at the selected reaction temperature. Vessels of stainless steel, platinum, gold, metal vessels lined with polytetrafluoroethylene, and the like can be employed. The process may be carried out on a batch basis or on a continuous basis with the use of suitable equipment for feeding the reactants and exhausting the products.

Temperatures outside the range of 100 to 250° C., indicated above, may be employed. However, at temperatures below 100° C., the yields of $PF_3S$ are undesirably low, and at temperatures above 250° C., at least part of the $PF_3S$ product is lost through decomposition.

The process is operable at atmospheric pressure. However, for optimum yields of $PF_3S$, it is preferred to operate in a closed system under pressure. Gauge pressures in the range from 10 pounds to 1500 pounds are preferred. Pressure is most readily provided by the HF reactant which at the indicated temperatures has vapor pressures within the preferred range. Additional pressure may be obtained by adding to the system inert gases such as nitrogen or helium. The time of reaction is not critical since at least some $PF_3S$ is formed immediately when HF and $P_4S_{10}$ are brought in contact at temperatures above 100° C. Best yields are obtained when the reaction time is at least five seconds. Contact times as long as 24 hours may be used.

The molecular proportions in which HF and $P_4S_{10}$ may be brought together to carry out the reaction of this invention can be varied widely such as from 1:10 to 20:1. It is preferred to employ at least a slight excess of HF since the excess serves as a reaction medium. Molar proportions in the range from 6:1 to 10:1 are particularly preferred.

In the following examples parts are by weight unless otherwise indicated.

Example I

In a stainless steel pressure vessel, 11 parts of $P_4S_{10}$ is placed. Gases in the vessel are removed by evacuation and 10 parts of hydrogen fluoride is added. The vessel is closed and the contents heated at 200° C. for 8 hours. The pressure is about 430 p.s.i. The vessel is then cooled to room temperature. Gaseous products are bled slowly through a trap cooled at −78° C., from which 8.5 parts of $PF_3S$ is recovered.

Example II

The procedure of Example I is repeated except that the reactants are heated at 180° C. for 8 hours. The pressure is about 345 p.s.i. There is recovered 3.9 parts of $PF_3S$.

Phosphorus thiofluoride, also known as thiophosphoryl fluoride, is useful in the manufacture of organic phosphorus compounds and as a reagent in organic chemistry. It is explosive when mixed with moist air and is spontaneously inflammable at room temperature.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing phosphorus thiofluoride which comprises reacting phosphorus pentasulfide and hydrogen fluoride at a temperature of from 100° to 250° C.
2. Process of claim 1 where the reaction is effected in a sealed vessel under autogenous pressure.
3. Process of claim 1 wherein the mole ratio of hydrogen fluoride to phosphorus pentasulfide is from 6:1 to 10:1.

References Cited

Mellor: Comprehensive Treatise on Inorganic and Theoretical Chemistry, vol. 8 (1928), p. 997.

OSCAR R. VERTIZ, *Primary Examiner.*

H. S. MILLER, *Assistant Examiner.*